June 6, 1967
E. J. ATKINSON
3,323,635
VARIABLE FEED WORM
Filed Nov. 22, 1965
3 Sheets-Sheet 1
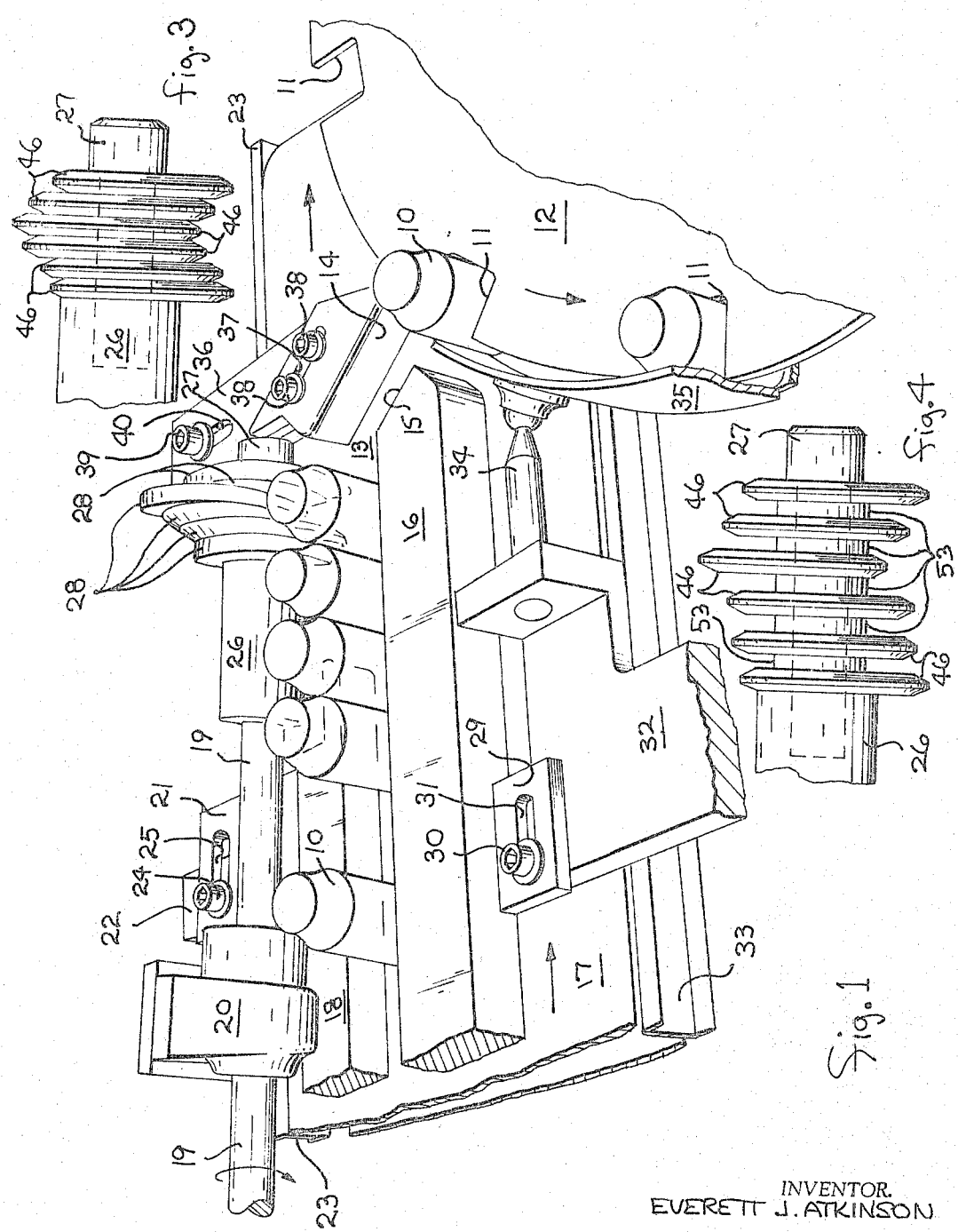
INVENTOR.
EVERETT J. ATKINSON
BY J. L. Nelson and
W. A. Schlich
ATTORNEYS

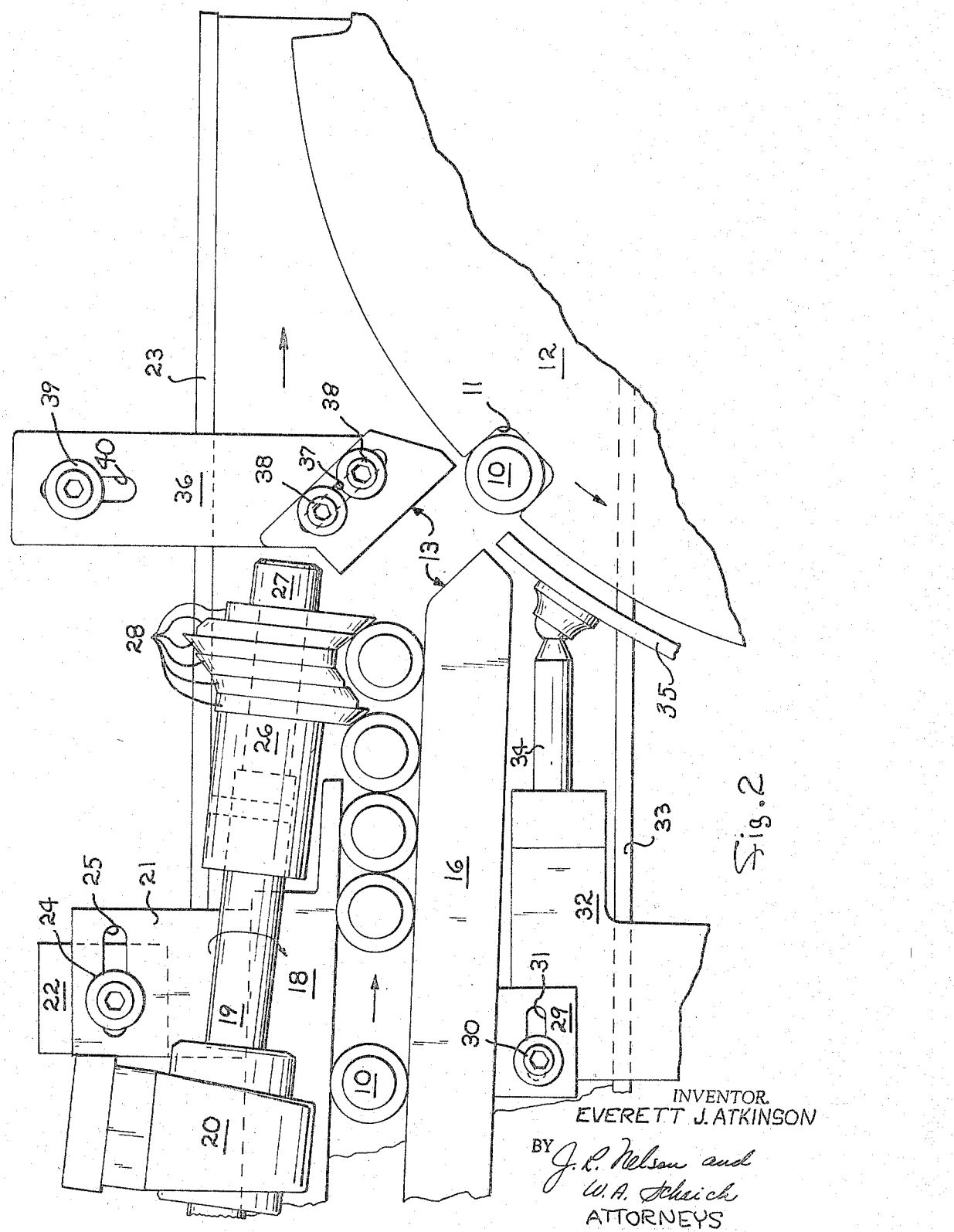

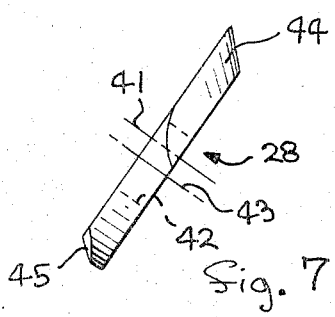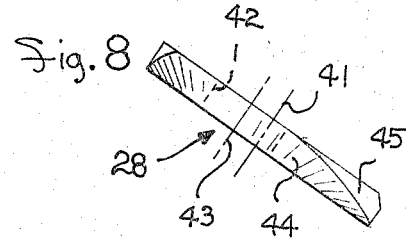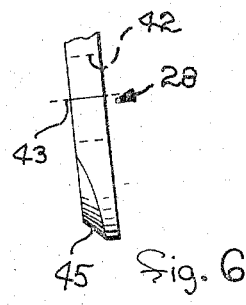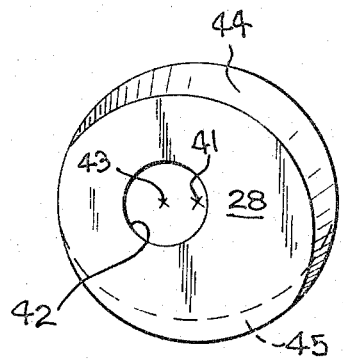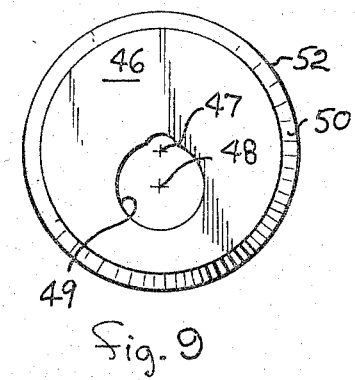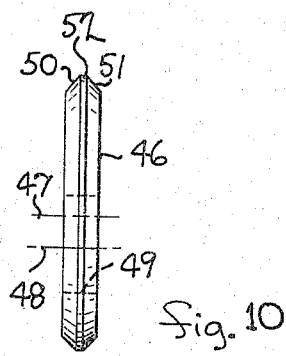

United States Patent Office 3,323,635
Patented June 6, 1967

3,323,635
VARIABLE FEED WORM
Everett J. Atkinson, Toledo, Ohio, assignor to Owens-Illinois, Inc., a corporation of Ohio
Filed Nov. 22, 1965, Ser. No. 509,034
11 Claims. (Cl. 198—34)

The present invention relates to a helical worm element, and more particularly to a worm feed screw used to space, time and advance cylindrical objects, such as bottles, cans or the like.

Infeed worms have been used to feed cylindrical containers into a piece of equipment for either inspecting the container, filling it, or labeling it. As quite often is the case, worm feed elements are located along a conveyor that is advancing cylindrical containers, such as bottles, into and through an inspection zone, or like operation, whereat the bottles need be timed and spaced. The feed worm of these operations is formed as a helical screw having a root portion formed as a helical groove that will receive the cylindrical containers and advance them in accordance with the rate of rotation of the helical element and the forward movement of the conveyor transporting the bottle. The worm speed is such that it is always slightly less than the forward speed of the bottle conveyor. This holds the bottles back (causes them to slip) on the bottle conveyor until the worm releases them one at a time. In this manner, the bottles are at equally spaced intervals on the conveyor. The rotational displacement of the worm may be synchronized with one of the elements of the machine that is to receive the bottle, that is, the inspecting machine, etc. The prior helical elements have been most often formed from a cylindrical maple (hardwood) block. Some forms of the infeed worm have been manufactured from materials that are cast or molded and finished formed into a solid helix element. An example of material of this nature often used is "Micarta."

The prior worm screws are inflexible in bottle size adaptation. Each given bottle size or diameter will require its separate worm and spacing between the flutes or threads of the helix. Generally, the helical screws or worms are made of a relatively hard material such that the screw element gradually introduces the bottle into the pitch of the flutes of the worm to avoid jamming or otherwise damaging the bottles or the mechanism.

It is accordingly an object of the present invention to provide a simple, adjustable helical screw for feeding round articles into a machine on a conveyor.

Another object of the invention is to provide an improved flight or infeed screw element which will time and space articles, such as cylindrical bottles, moving on a horizontal conveyor and in the minimum of engagement with the helix, that is, for not longer than one revolution of the helical element.

A still further object of the invention is to provide an adjustable helical worm element that is easily and readily adjustable and adaptable to a wide range of sizes of cylindrical articles, such as bottles, jars or cans and the like, yet inexpensive to manufacture and assemble.

A further object of the invention is to provide a helical worm element that is capable of adjustment or variation from one size and pitch of helix to another to accommodate various sized cylindrical articles.

Another object of the invention is to provide such an adjustable helical worm element that is operable in either direction of rotation.

The specific nature of this invention, as well as other objects and advantages thereof, will become apparent to those skilled in the art from the following detailed description, taken in conjunction with the annexed sheets of drawings, on which, by way of preferred example only, are illustrated embodiments of this invention.

In the drawings:

FIG. 1 is a perspective view of one embodiment of the invention in use for the infeed of cylindrical articles into the slots of a turret of a machine for further processing them.

FIG. 2 is a plan view of the one embodiment of the invention of FIG. 1.

FIG. 3 is a fragmentary side elevational view of another embodiment of the invention.

FIG. 4 is a fragmentary side elevational view of a further embodiment of the invention.

FIG. 5 is a side detail view of the off-set disc element which is used in the make up of a worm element of the type shown on FIGS. 1 and 2.

FIGS. 6, 7 and 8 are projected end views of the disc of FIG. 5.

FIG. 9 is a side view of the off-set disc element which is used in the make up of a worm element of either type shown on FIGS. 3 or 4.

FIG. 10 is an end view of the disc element shown on FIG. 9.

The present invention, in its preferred forms, relates to a variable, adjustable infeed worm for timing and spacing cylindrical containers or like articles on a moving conveyor. The worm is constructed of a plurality of like discs that are bored off center so as to be eccentrically mounted on a shaft. The discs are chamfered at their outer peripheral face. The desired number of the discs are mounted and held together on the timed shaft of the equipment. Adjusting the discs rotationally at positions about the shaft will form a helical worm which has a given pitch and a root or groove for receiving a container between the helical flute formed by the discs in this adjusted position. The discs may be manufactured of a suitable material selected for article handling.

The timed shaft is mounted over a conveyor that is advancing the articles to the point of infeed control. The articles are further guided on the conveyor into engagement with the worm by a guide means properly positioned. The timed shaft is turned in synchronism with the machine the worm infeed is to serve, thereby advancing and timing the containers to this machine. Each revolution of the shaft will feed one article into the machine it serves. A fixed guide rail is positioned with respect to the conveyor advancing the containers to guide the containers to the worm and hold them in the worm for controlled advance or infeed to the machine. Conveyor speed is such that the worm will hold the containers back, as is the usual practice with infeed worms.

With reference to the figures, the invention in its preferred form, will be more completely described.

On FIGS. 1 and 2, the invention is illustrated in operation for feeding bottles 10 into the pockets 11 of a turret 12 on a glassware inspecting machine. Turret 12 is intermittently indexed in the direction of the arrow (counterclockwise), such that the pockets 11 thereon pause opposite the path 13 defined by the guide 14 and the angled end face 15 of the guide bar 16. Bottles 10 are supplied by the conveyor 17 moving toward and beneath the turret 12. As the bottles 10 approach the guide path 13, a second guide bar 18 is mounted substantially parallel to and horizontally spaced from the guide bar 16. This defines the path for entry of the bottles 10 into the infeed zone. At this infeed zone is mounted the novel worm element of the invention. This element comprises a longitudinal shaft 19 rotatably supported in bearings of the bracket 20. Bracket 20 is integral with the plate 21 mounted on a fixed horizontal plate 22 of the frame beam 23 of the bottle conveyor. The connection between plate 21 and mounting plate 22 is by the cap screw 24 through the elongated slot 25 in plate 21 and in turn threaded into the underlying plate 22. This slot 25 permits longitudinal displacement and adjustment of the position of the shaft 19. The shaft 19 has an end boss 26 that is axially threaded to receive the stub shaft 27. The stub shaft 27 has a plurality of similar relatively thin circular disc elements 28 thereon which are rotationally arranged to denfie the helical worm element. The ratio of the diameter of the disc to its thickness should be a whole number greater than one. For example, a 2 inch diameter disc may be on the order of ¼ inch in thickness. The thinner the disc (higher the ratio number of diameter to thickness) the larger number that may be used. Related to this, the larger number of relatively thinner discs, the smoother the spiral or helix that may be formed. In the example shown on FIGS. 1 and 2, the disc elements number 5 and provide a right-hand worm. That is, the shaft 19 is driven clockwise by a suitable motor and transmission unit (not shown). The elements 28 are rotationally arranged to provide a flute and root arrangement of the helix forming a groove and spiral of a worm that will receive a particular size of bottle 10. The pitch and length of the spiral or thread of the worm will to some extent determine the number of the elements 28 that are used on the shaft. A spiral of at least one revolution should be formed on the shaft by the thin disc elements for the purpose of constructing an infeed worm suitable for feeding cylindrical containers to machine. As the helix rotates, the pocket or groove of the worm will advance one bottle 10 between the flute and for each revolution of shaft 19 and feed it into the defined path 13. Subsequently, and in turn, the bottle will enter into the pocket 11 of the turret that is then opposite the path 13. The infeed capacity of the worm element 28 is regulated and synchronized with the rate of index of the turret 12 so that for every advance of a pocket 11 of turret 12 to the infeed path 13, the shaft 19 makes one revolution. The conveyor 17 is made to travel slightly faster than this advance of the individual bottles 10 by the worm element 28 such that the worm actually holds the bottles back and times them and spaces them in accordance with the infeed requirement of the machine.

To accommodate different ware sizes, the guide bar 16 is fastened to the bracket 29. This is fastened by the bolt 30 through the elongated slot 31 of the bracket 29 and threaded into the member 32 that is supported on the side beam 33 of the bottle conveyor. The member 32 also includes an upright bracket which supports the threaded rod 34 connected to the upright arcuate guide plate 35 for retaining the bottles in the pockets of the turret. This adjustment by rod 34 and the adjustment of the bar 16 allows variations in diameter of bottle 10 that may be handled on the machine.

The guide member 14 is adjustably connected onto the lateral plate 36 by its slot 37 and cap screws 38 threadedly connected into the plate 36. The plate 36 is connected to beam 23 of the conveyor by cap screw 39 through the slot 40 allowing a lateral adjustment of the plate 36.

In the first embodiment, the disc elements 28 are constructed as shown on FIGS. 5–8 of the drawings. The centers of the discs lie at the point 41 and the discs are bored off-center to provide a shaft receiving hole indicated at 42. The center of this bored hole is at 43. Accordingly, each element 28 is eccentric, when mounted on the stub shaft 27 and against boss 26, by the distance between 41 and 43 on FIG. 5. The outer periphery of the elements 28 are chamfered at about a 45° slope on the face indicated at 44. The face indicated at 45 is chamfered about the same degree of slope but in the opposite direction. As the elements 28 are assembled on the stub shaft 27 and before it is tightened into boss 26 of the shaft, they are rotationally arranged to form the proper helix to accommodate a given bottle diameter. After this is arranged, the stub shaft is tightened to securely hold the elements in this arrangement.

The second embodiment of the invention is shown on FIG. 3. The plurality of elements 46 are arranged on the stub shaft 27 threadedly connected into the boss 26 of the shaft 19. This disc element 46 is shown on FIGS. 9 and 10. The geometric center of the circular element 46 is at center 47. The mounting hole 49 is bored off-center at its center 48, similar to the mounting hole of elements 28 of FIGS. 5–8. However, the elements 46 have their outer edge faces 50 and 51 chamfered a like amount and a medial ridge 52 forms the larger radial face of the element. In section, this element is symmetrical and bored for an eccentric mounting on the stub shaft 27. The plural elements 46 are radially arranged on the stub shaft 27, as shown on FIG. 3, before this shaft is tightened onto the boss 26, thus providing a suitable helical worm surface for a given bottle size.

This form of worm element, just-described, is suitable for operation in either direction of rotation by shaft 19. Thus, it may be used to feed either a right-hand or left-hand machine.

A still further embodiment of the invention is illustrated on FIG. 4. The worm element in this example is comprised of plural disc elements 46, as described above, but between adjacent elements 46 are spacers or washers 53. The diameter of the discs 46 may be somewhat larger, and the washers space the elements 46 such that a helix may be formed by the radial arrangement of the various successive elements on stub shaft 27 to accommodate larger diameter bottles. This form of the invention similarly will operate with either direction of rotation of the shaft 19. The direction of rotation will, of course, be determined by whether a left-hand or right-hand infeed to the machine is needed.

The disc elements of either form of the invention may be made in standard sizes and in large numbers. They may be constructed of any suitable material to meet engineering standards of the job to be performed. Examples of commercial materials which are suitable are Micarta, Transite, Fiberglas, rubber, tire cord, nylon, Teflon, Plexiglas, wood, and in cases of handling tin cans in the feed screw, aluminum or cast iron would be suitable materials.

One of the main advantages of the invention is the flexibility of operation of the formed worm. If portions of it become worn, a stock of the disc elements on hand allow easy replacement and rebuilding of the worm at a low cost. The worm of this invention is versatile in that it can be adopted to handle a variety of sizes of ware without rebuild or reconditioning, and yet it can be constructed of a material or materials chosen for properties in handling the articles with efficiency and least damage thereto. Or, a variety of materials may be used in a single worm. For example, some of the disc elements 46 may be formed of one material such as Micarta and operated adjacent to discs of dissimilar materials, such as nylon, Teflon on softer materials as rubber. Each material may be selected for its property in the disc or discs of the worm to achieve a purpose in conveying the articles 10.

While embodiments of the present invention have been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. A feed worm comprising a worm shaft and retaining means thereon, a stub shaft, means axially attaching the stub shaft to said shaft to extend outwardly of said retaining means, and a plurality of relatively thin, circular disc elements, means on said elements for eccentrically mounting them on said stub shaft and held thereon by said retaining means, the disc elements being rotationally arranged to form a revolution of a helix adapted to feed articles engaging same upon rotation of said worm shaft.

2. The worm defined by claim 1, wherein the disc elements have their radial faces chamfered.

3. The worm defined by claim 2, wherein the chamfer of the disc radial faces are complementary to form a set of disc elements suited to advance articles it engages axially of the worm shaft in a given direction only upon rotation in one direction.

4. The worm defined by claim 2, wherein the disc radial faces are chamfered on two opposite but complementary slopes which lie on intersecting planes and the disc elements are suited to advance articles it engages axially of the worm shaft in a given direction upon rotation of the worm shaft in either direction.

5. The worm defined by claim 4, wherein the worm is constructed of plural disc elements on said stub shaft and a washer on said shaft between each adjacent pair of disc elements thereon for spacing the radial facings of the said disc elements.

6. Apparatus comprising a plurality of disc elements each being characterized as having a thin circular body, a mounting aperture formed through said body and located eccentrically on said body, and a sloped radial face, a portion of which is operable as an article engaging cam face, a rotational member, said elements being attached onto said rotational member for rotation about their said eccentric mounting apertures, the several said elements being rotationally spaced in succeeding similar steps on said rotational member to form a revolution of a helix, the rotation of said rotational member through one revolution causing the helix to advance sufficiently to feed one article past said member.

7. The apparatus defined by claim 6, wherein the disc elements have a ratio of their body diameter to a thickness that is at least 4 to 1 and the outer peripheral faces of said disc elements are chamfered.

8. The apparatus defined by claim 7, wherein the periphery of the said outer peripheral faces of said disc elements are chamfered on two intersecting slopes and said chamfers are symmetrical on the discs.

9. The combination of a turret rotatably mounted and having peripheral article receiving means for carrying cylindrical articles with the turret, a horizontal conveyor extending to the periphery of said turret for advancing said articles thereto, guide means overlying the conveyor and spaced laterally therewith to feed said articles into a single file line on the conveyor, said guide means defining a path through an infeed zone and into communication with article receiving means of said turret, worm means, means mounting the worm means in said path at the infeed zone to intercept the articles moving therein and control their movement to said article receiving means, said worm means comprising a substantially horizontal shaft, means mounting the shaft for rotation, plural thin disc elements eccentrically mounted on said shaft and arranged thereon in the form of a helical groove along the shaft, the shaft being positioned such that the helical groove formed by said discs engage articles in said path in the infeed zone and retard their movement on the conveyor such as to time the introduction of the articles to the article receiving means of the turret.

10. The combination defined by claim 9, wherein the article receiving means comprise peripheral pockets formed on said turret, the turret advancing by intermittent indexing movement to present said pockets at the path of said infeed zone and the successive pockets of the turret arrive in communication with said path coincident with the timed release of the articles by disc elements defining the helical groove.

11. The combination defined by claim 9, wherein the guide means comprise stationary members mounted in spaced apart relationship overlying the conveyor for guiding cylindrical articles therebetween into the infeed zone for loading the machine turret, a guide member, means mounting the guide member at a point beyond the helical groove of the infeed worm means and angularly arranged with respect to said stationary members, said guide means mounting providing for angular and lateral adjusting movement over the conveyor, said guide member defining the infeed path for articles released from the terminal end of the helical groove of said worm means and guiding movement of the articles by the conveyor into a pocket of said turret.

References Cited

UNITED STATES PATENTS 587,713   8/1897   Dutton _____ 74—444
1,367,061   2/1921   Lewis _____ 198—219 X EVON C. BLUNK, *Primary Examiner.*

RICHARD E. AEGERTER, *Examiner.*